(12) United States Patent
Hase et al.

(10) Patent No.: US 9,452,727 B2
(45) Date of Patent: Sep. 27, 2016

(54) INTERIOR SIDE WALL STRUCTURE FOR A VEHICLE

(71) Applicant: KASAI KOGYO CO., LTD., Kanagawa (JP)

(72) Inventors: Naohiko Hase, Kanagawa (JP); Daisuke Irokawa, Kanagawa (JP); Hiroyuki Kojima, Kanagawa (JP); Eiji Jumonji, Kanagawa (JP)

(73) Assignee: KASAI KOGYO CO., LTD., Kanagawa (JP)

( * ) Notice: Subject to any disclaimer, the term of this patent is extended or adjusted under 35 U.S.C. 154(b) by 0 days.

(21) Appl. No.: 14/650,517

(22) PCT Filed: Dec. 16, 2013

(86) PCT No.: PCT/JP2013/007384
§ 371 (c)(1),
(2) Date: Jun. 8, 2015

(87) PCT Pub. No.: WO2014/097606
PCT Pub. Date: Jun. 26, 2014

(65) Prior Publication Data
US 2015/0298637 A1    Oct. 22, 2015

(30) Foreign Application Priority Data

Dec. 20, 2012 (JP) ................................ 2012-277591

(51) Int. Cl.
*B60R 21/04* (2006.01)
*B60J 5/04* (2006.01)
*B62D 25/02* (2006.01)

(52) U.S. Cl.
CPC .......... *B60R 21/0428* (2013.01); *B60J 5/0451* (2013.01); *B62D 25/02* (2013.01)

(58) Field of Classification Search
CPC .............. B60R 13/02; B60R 13/0243; B60R 13/0237; B60R 21/04; B60R 21/0428; B60J 5/0413; B60J 5/0451; B62D 25/02
USPC ................. 296/187.3, 187.05, 187.12, 146.7
See application file for complete search history.

(56) References Cited

U.S. PATENT DOCUMENTS 6,474,721 B2 * 11/2002 Nishikawa ............. B60J 5/0416
296/146.6
6,779,835 B2   8/2004 Fox et al.
(Continued)

FOREIGN PATENT DOCUMENTS

JP    H07-13533 U      3/1995
JP    2001-080439 A    3/2001
(Continued)

OTHER PUBLICATIONS

International Search Report for PCT/JP2013/007384, Mar. 18, 2014.
European Patent Office, Extended European Search Report for EP Patent Application No. 13865954.5, Jun. 21, 2016.
State Intellectual Property Office of the Peoples Republic of China, Search Report for Chinese patent application No. 201380062082.6, Jun. 29, 2016.

*Primary Examiner* — Gregory Blankenship

(57) ABSTRACT

Provided is an interior side wall structure for a vehicle in which a cylindrical shape of a shock-absorbing member can be crushed and deformed in an axial direction in an orderly manner upon vehicle side collision. When a collision load (F) is input to a shock-absorbing member (10) in the axial direction, a flange portion (13) at a peripheral edge of an open part is uniformly pressed against a door trim (4). At a connecting portion (15) of a peripheral wall (11), stress is distributed by an arc shaped face, whereby the development of crack is avoided, thus enabling even distribution of the load. At the connecting portion (15), buckling rigidity is adjusted by a slit for compression buckling adjustment (16) so as to substantially equalize the buckling rigidity at each portion of the peripheral wall (11), whereby the cylindrical shape of the shock-absorbing member (10) is crushed and deformed in the axial direction in an orderly manner.

5 Claims, 5 Drawing Sheets

(56) References Cited

U.S. PATENT DOCUMENTS

| | | | |
|---|---|---|---|
| 7,677,640 B2 * | 3/2010 | Dix | B60R 21/0428 296/146.7 |
| 8,029,041 B2 * | 10/2011 | Hall | B60J 5/0451 296/146.6 |
| 8,215,699 B2 * | 7/2012 | Suzuki | B60J 5/0451 296/146.6 |
| 8,678,476 B2 * | 3/2014 | Hirose | B60R 21/055 296/187.05 |
| 2003/0107242 A1 | 6/2003 | Fox et al. | |
| 2008/0012384 A1 | 1/2008 | Sielhorst et al. | |
| 2010/0225144 A1 * | 9/2010 | Endo | B60J 5/0251 296/187.05 |
| 2010/0259069 A1 | 10/2010 | Suzuki et al. | |
| 2011/0233962 A1 * | 9/2011 | Tada | B60J 5/0451 296/187.12 |
| 2012/0152674 A1 * | 6/2012 | Fukuo | F16F 7/121 188/377 |
| 2014/0035322 A1 * | 2/2014 | Sakhara | B62D 25/02 296/187.12 |
| 2015/0123426 A1 * | 5/2015 | Steinbrecher | B60R 13/0243 296/187.03 |
| 2015/0298637 A1 * | 10/2015 | Hase | B60R 21/0428 296/187.12 |

FOREIGN PATENT DOCUMENTS

| | | |
|---|---|---|
| JP | 2008-513714 A | 5/2008 |
| JP | 2009-012560 A | 1/2009 |
| JP | 2010-264971 A | 11/2010 |
| JP | 2011-230571 A | 11/2011 |
| JP | 2012-116244 A | 6/2012 |
| JP | 2012-240472 A | 12/2012 |
| JP | 2013-184661 A | 9/2013 |

* cited by examiner

INTERIOR SIDE WALL STRUCTURE FOR A VEHICLE

TECHNICAL FIELD

The present invention relates to an interior side wall structure for a vehicle.

BACKGROUND ART

For example, as disclosed in Patent Documents 1-3, a shock-absorbing member is provided between a door trim of a side door and a door inner panel, as an occupant protective measure in case of a vehicle collision from a side, so that collision energy may be absorbed when the shock-absorbing member is crushed and deformed by a collision load at the time of the vehicle side collision.

The shock-absorbing member whose one side is opened, is made of appropriate synthetic resin material, and is formed in an angulated cylinder shape, for example, a rectangular tube. For example, a side portion on the opening side of the shock-absorbing member is arranged on a portion corresponding to a necessary part on a back face of the door trim, i.e., a seated occupant's waist, a shoulder section, etc., and an end wall thereof is provided so as to face a door inner panel and be close to a face thereof.

In the configuration, when the door inner panel is deformed toward a vehicle interior side at time of a vehicle side collision, the shock-absorbing member is crushed and deformed in an axis direction between the door trim and the door inner panel, so that the collision energy thereof may be absorbed.

PRIOR ART DOCUMENTS

Patent Documents

Patent Document 1: Japanese Patent Application Publication No. 2008-513714
Patent Document 2: Japanese Patent Application Publication No. 2011-230571
Patent Document 3: Japanese Patent Application Publication No. 2001-80439

SUMMARY

Technical Problem

Contact of the door inner panel to the end wall of the shock-absorbing member at the time of the vehicle side collision is not the same and depends on a deformation state of the door inner panel, so that the contact of the shock-absorbing member to the end wall varies, such as full-wrap contact, offset contact, and/or slanting contact.

For this reason, even in any of shock-absorbing members disclosed in PATENT DOCUMENTS 1-3, it is difficult to crush and deform a cylindrical shape member in an axis direction in an orderly manner so as to performs an optimal collision energy absorption.

In particular, as in the shock-absorbing members disclosed in PATENT DOCUMENTS 2 and 3, in case of a structure in which each of connecting portions of adjacent side walls of a polygonal cylinder peripheral wall is in form of a line (angled portion), and cracks in this connecting line occur upon crush and deformation, timing of the crack occurrence of each of the connecting lines varies, so that the axis line of crush deformation goes down whereby there is a high possibility that it becomes unstable.

Moreover, while it is necessary to shape side walls on an opening side of the shock-absorbing member on the same plane according to a molding face of a door trim, it is necessary to secure parallelism of the end wall with respect to the door inner panel, so that variation of the height dimension in the axis direction of the shock-absorbing member at each part thereof is also a factor that the above-mentioned crush and deformation may not be performed in an orderly manner.

Therefore, the present invention is to offer an interior side wall structure for a vehicle, which is capable of enhancing a collision energy absorption effect by crushing and deforming a cylinder shaped shock-absorbing member in an axis direction in an orderly manner at time of a vehicle side collision.

Solution to Problem

An interior side wall structure for a vehicle according to the present invention is based on a structure, wherein a synthetic resin shock-absorbing member in a shape of a polygonal cylinder, which is open at one side thereof facing trim material, and which has a flange portion projected to outside at a peripheral edge, is fixed to a back face of the trim material which is attached in order to cover a side wall panel face on a vehicle interior side, so that collision energy may be absorbed when the above-mentioned shock-absorbing member is crushed and deformed in response to a collision load at time of a vehicle side collision.

And it is mainly characterized in that connecting portions between adjacent side walls in a peripheral wall of the shock-absorbing member is formed in an arc shape, and a slit for compression buckling adjustment, which has a necessary length, is formed in an input direction of the collision load at an approximately top part of an arc shape in a range between a corner part where the peripheral wall and the end wall adjoin to each other and a flange portion forming base.

Advantageous Effects of Invention

According to the present invention, when the side wall panel of the vehicle interior is deformed toward the vehicle interior side so as to be brought in contact with the end wall of the shock-absorbing member in case of a vehicle side collision, the collision load is input into the shock-absorbing member in an axis direction, and a peripheral edge of the open part is uniformly brought, by pressure, into contact with the trim material by the flange portion. On the other hand, since each of connecting portions between adjacent side walls of the peripheral wall, is formed as an arc shaped face, stress is distributed so that it is possible to avoid generation of cracks due to the stress concentration at the connecting portion.

Thereby, even where the side wall panel is irregularly deformed so that offset contact or slanting contact occurs at the end wall of the shock-absorbing member, the collision load is almost equally distributed to the peripheral wall of the shock-absorbing member.

At this time, even if sizes in length dimension (height dimension) of the connecting portions of the peripheral wall differ from one another, since the rigidity thereof in the axis direction is adjusted by the slit for compression buckling adjustment, it is possible to crush and deform the cylinder shape shock-absorbing member in the axis direction in an orderly manner.

As a result, since there is no crack generation in the axis direction at each of connecting portions of the peripheral wall of the shock-absorbing member, or no decrease of the robustness of the shock-absorbing member due to the deviation of crushing deformation, appropriate crush and deformation of the shock-absorbing member is performed from an early stage of collision to a late stage of the collision, so that it is possible to enhance collision energy absorption effect.

BRIEF EXPLANATION OF THE DRAWINGS

FIG. 10 It shows an explanatory side view of a shock-absorbing member, which is an example of different arrangement from.

EMBODIMENTS

Description of embodiments according to the present invention will be given below in detail, referring to an example of a side door of a vehicle shown in figures.

Figure 1:
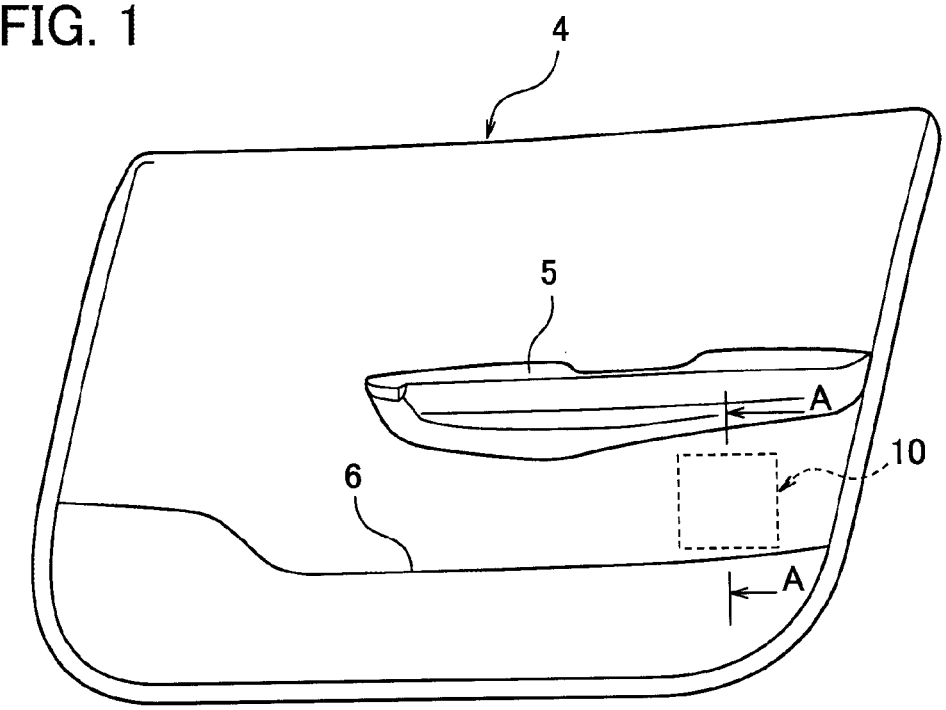
FIG. 1 It is a side view showing a door trim as an example in which the present invention is applied to a side door of a vehicle.
Figure 2:
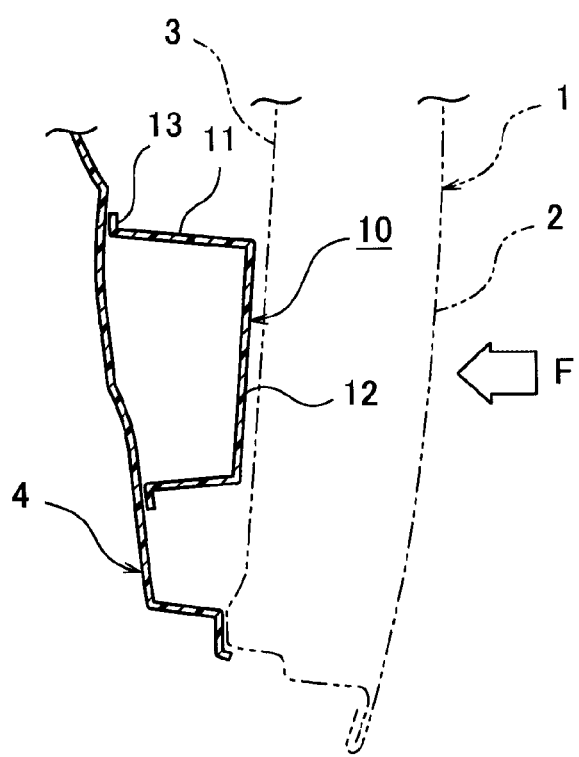
FIG. 2 It is an explanatory cross-sectional view taken along a line A-A of FIG. 1.

As shown in FIG. 1 and FIG. 2, a side door 1 is formed as a closed cross section by a door outer panel 2 and a door inner panel 3. The door inner panel 3 forms part of a side wall panel for a vehicle interior, and a door trim 4 is attached as trim material to a side face of the vehicle interior side thereof.

While the door trim 4 is molded by using appropriate synthetic resin material, and a door arm rest 5 is provided in an intermediate portion thereof in a vertical direction, a door pocket 6 is formed in a lower side portion.

A shock-absorbing member 10, which has great-shock absorption property and which is made of elastomer resin etc. is provided on a necessary part of the door trim 4.

The shock-absorbing member 10 is formed in a shape of a polygonal cylinder whose one side is open, and when a vehicle is hit from a side, and a portion between the door inner panel 3 and the door trims 4 receives a collision load F in a vehicle width direction, it is crushed and deformed, thereby absorbing the collision energy.

Specifically, a body part of the shock-absorbing member 10 whose peripheral wall 11 is provided in a horizontal direction, is arranged in a spaced portion between the door inner panel 3 and the door trim 4, so as to be crushed and deformed in an axial direction in response to the collision load F, so that the collision energy may be absorbed. This collision energy absorption feature is uniquely defined by the deformation stroke in the axis direction of the shock-absorbing member 10, and deformation reaction thereof.

Figure 3:
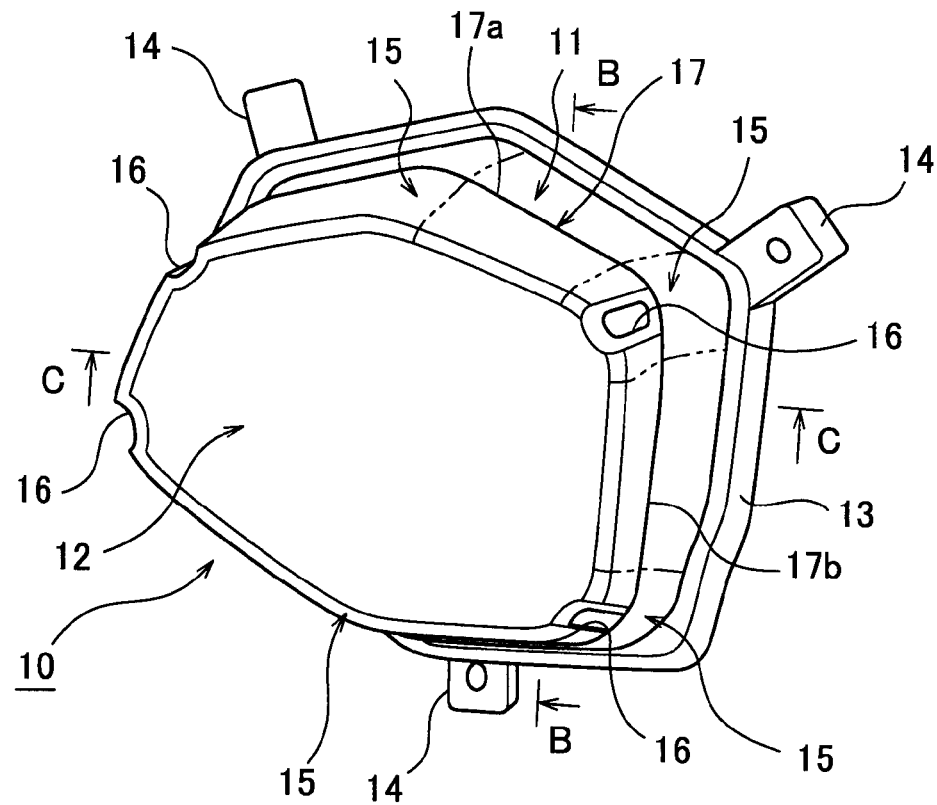
FIG. 3 It shows a perspective view of a shock-absorbing member according to a first embodiment.

In this embodiment, as shown in FIG. 3, the shock-absorbing member 10 is formed so as to be horizontally long in a front and back direction of the vehicle and so as to be in a shape of polygonal cylinder which is a hexagon cylinder. A flange portion 13, which projects toward outside thereof is integrally molded on a peripheral edge of the open part on one side, and the open part side, on which the flange portion 13 is formed, is arranged so as to face a back face of the door trim 4.

As to fixation of the shock-absorbing member 10 to the door trim 4, for example, two or more bracket parts 14 are formed as protrusions close to the flange portion 13 of the shock-absorbing member 10, and boss parts not shown in the figures, which are formed as protrusions on the back face of the door trim 4 can be fixed to the bracket parts 14 by thermal caulking.

In view of protective measures of an occupant of the vehicle at time of a vehicle side collision, the shock-absorbing member 10 is arranged on an impact area corresponding to a seating occupant's waist on the door trim 4, so that the longitudinal of the shock-absorbing member 10 may be arranged in the front and back direction of the vehicle, as described above.

As shown in FIG. 2, the door trim 4 has a configured face, which is not flat or uniform in shape so that it is very uneven, in order that a door arm rest 5 and a door pocket 6 etc. may be arranged thereon, as mentioned above.

Therefore, a side face shape of the shock-absorbing member 10 on the open part side thereof, on which the flange portion 13 facing the door trim 4 is formed, is matched with the uneven molded face of the door trim 4. On the other hand, the end wall 12 which faces the door inner panel 3 on the other side, is flatly formed so as to maintain parallelism with respect to the door inner panel 3.

For this reason, the shock-absorbing member 10 does not have a uniform height dimension in an axis direction, as shown in FIG. 2, that is, each portion has different height, so that each portion has different rigidity in the axis direction according to the height dimension.

Therefore, in this embodiment, as mentioned above, the flange portion 13 is formed on the open part peripheral edge of the shock-absorbing member 10, so that it can be uniformly brought in contact with the back face of the door trim 4 with pressure. In addition, faces of the connecting portions 15 between adjacent side walls of the peripheral wall 11 are formed in an arc shape. Further, slits 16 for compression buckling adjustment are formed in approximately top parts.

These slits 16 for compression buckling adjustment are formed in a range between a corner part having a necessary cut-out curved face, where the peripheral wall 11 and the end wall 12 are adjoined to each other, and a forming base of the flange portion 13 also having a necessary cut-out curved face.

Although the slits 16 for compression buckling adjustment, whose lengths are different from one another, can be formed in all the connecting portions 15 of the peripheral wall 11, respectively, in this embodiment, these slits 16 for compression buckling adjustment are formed at ends in a longitudinal direction thereof where tendency for compression buckling rigidity to become large and at the connecting portions 15 on side walls where forming height becomes low.

In order to maintain high energy absorption characteristic high until a late stage of a side collision of a vehicle, a slit toe of the slit 16 for compression buckling adjustment is desirably formed at a necessary height dimension, for example, 10 mm or more from the forming base of the flange portion 13.

Figure 4:
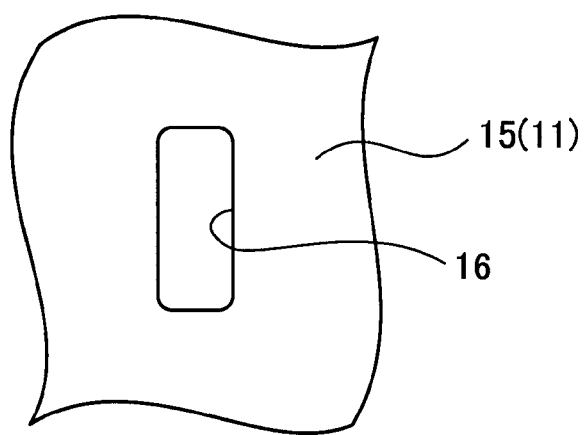
FIG. 4 It is an explanatory enlarged-expansion view of a slit.

Moreover, the cut-out corner parts for the slits 16 for compression buckling adjustment are formed in an arc-shape, thereby suppressing crack generation due to stress concentration, as shown in FIG. 4.

The curvature radius of the connecting portion 15, and the length dimension of the slits 16 for compression buckling adjustment, are arbitrarily set according to the board thickness of the peripheral wall 11, a connection angle between the adjoining side walls, or the height dimension of the peripheral wall 11, etc. For example, when the board thickness of the peripheral wall 11 is 1 mm-4 mm, the curvature radii of the connecting portions 15 are set to 20 mm-40 mm, the minimum size of the slits 16 for compression buckling adjustment is set to 10 mm, and the maximum length thereof can be set to the forming length from the connecting corner on a side of the flange portion 13 to the connecting corner of the end wall 12.

Moreover, the shock-absorbing member 10 has a folding line 17 which annularly extends on the peripheral wall 11.

For example, in the shock-absorbing member 10 shown in FIG. 3, the folding line 17 on the side walls in the up-and-down direction of the peripheral wall 11 is formed as outward folding lines 17a, which project on the outer side in a radial direction, and the folding lines 17 on the side walls in the front-and-back direction is formed as inner folding lines 17b, which project on the inner side in the radial direction, wherein these folding lines 17a and 17b form a ring shape which continues in a circumferential direction thereof.

In the side wall structure of the vehicle interior according to the embodiment which comprises the above structural elements, when the door inner panel 3 is deformed toward the vehicle interior side due to collision of a vehicle from a side face, thereby causing contact with the end wall 12 of the shock-absorbing member 10 so that a collision load F is input into this shock-absorbing member 10 in an axis direction, an open part peripheral edge is uniformly brought into contact with the back face of the door trim 4 by the flange portion 13 by pressure.

On the other hand, in each connecting portion 15 where side walls of the peripheral wall 11 are adjoined to each other, since the connecting portion 15 is formed as a face in an arc shape, stress is distributed so that it is possible to prevent generation of cracks due to stress concentration on the connecting portions 15.

Thereby, even when the door inner panel 3 is irregularly deformed, and brought in offset contact or slanting contact with the end wall 12 of the shock-absorbing member 10, the collision load F is almost equally distributed to the peripheral wall 11 of the shock-absorbing member 10.

At this time, even where the height dimension of the shock-absorbing member 10 varies according to the face shape of the door trim 4 so that length dimensions (height dimensions) of the connecting portions 15 of the peripheral wall 11 differ from one another, since the rigidity in an axis direction, namely, compression buckling rigidity is adjusted by the slit 16 for compression buckling adjustment, the cylinder shape shock-absorbing member is crushed and deformed in the axis direction in an orderly manner.

As a result, since there is no crack generation in the axis direction at each connecting portion 15 of the peripheral wall 11 of the shock-absorbing member 10, or no decrease of the robustness of the shock-absorbing member 10 due to the deviation of crush and deformation, appropriate crush and deformation of the shock-absorbing member 10 is performed from an early stage of the collision to a late stage of the collision, so that it is possible to enhance collision energy absorption effect.

Here, according to the embodiment, the cut-out corner parts for the slits 16 for compression buckling adjustment are formed in an arc-shape, it is possible to suppress crack generation due to stress concentration when the slits 16 are expanded in a circumferential direction of the peripheral wall 11 at time of crush and deformation in the axis direction of the shock-absorbing member 10.

The compression buckling rigidity of the connecting portion 15 can be decreased without cracks, so that the robustness decrease suppression effect of the shock-absorbing member 10 can be enhanced.

Moreover, since the annular folding line 17 is formed in the peripheral wall 11, compression buckling deformation of the peripheral wall 11 is carried out from the folding line 17 as the starting points, so that it is possible to perform the crush and deformation much more in the axis direction of the shock-absorbing member 10 in an orderly manner.

Especially, the folding line 17 on the side walls in the up-and-down direction of the peripheral wall 11 is formed as the outward folding lines 17a, which project on the outer side in a radial direction, and the folding line 17 on the side walls in the front-and-back direction is formed as the inward folding lines 17b, which project on the inner side in the radial direction, so as to continue in a circumferential direction thereof.

Figure 5:
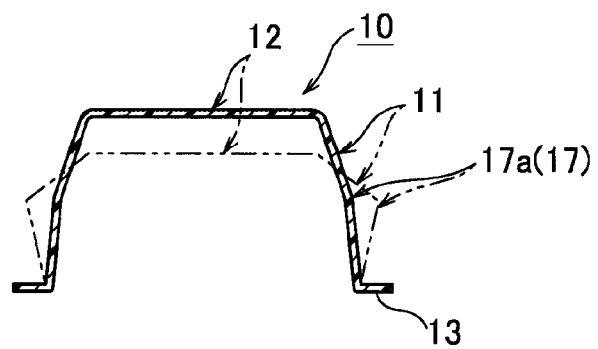
FIG. 5 It is an explanatory cross-sectional view taken along a line B-B line of FIG. 3 in which a crush and deformation state of a shock-absorbing member is schematically shown.
Figure 6:
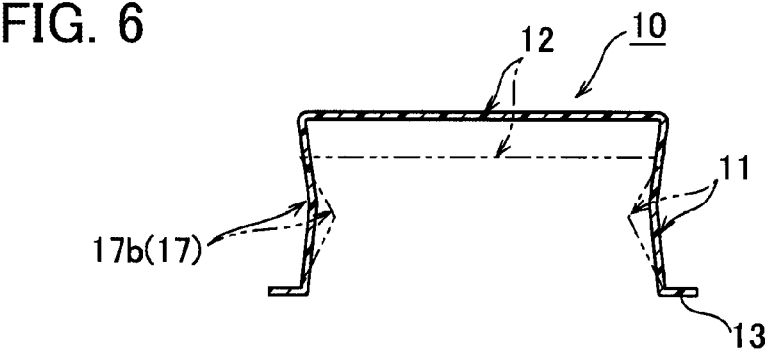
FIG. 6 It is an explanatory cross-sectional view taken along line C-C of FIG. 3 in which a crush and deformation state of a shock-absorbing member is schematically shown.

As such, as show in FIG. 5 and FIG. 6, while the side walls of the peripheral wall 11 in the upper-and-lower direction is buckled with an angle towards an outer side, the side walls in the front-and-back direction is buckled with an angle towards an inner side, whereby the side walls in the upper-and-lower direction and the side walls in the front and back direction will not squeeze or pull in each other so that it is possible to facilitate crush and deformation thereof in the axis direction much more in an orderly manner.

Figure 7:
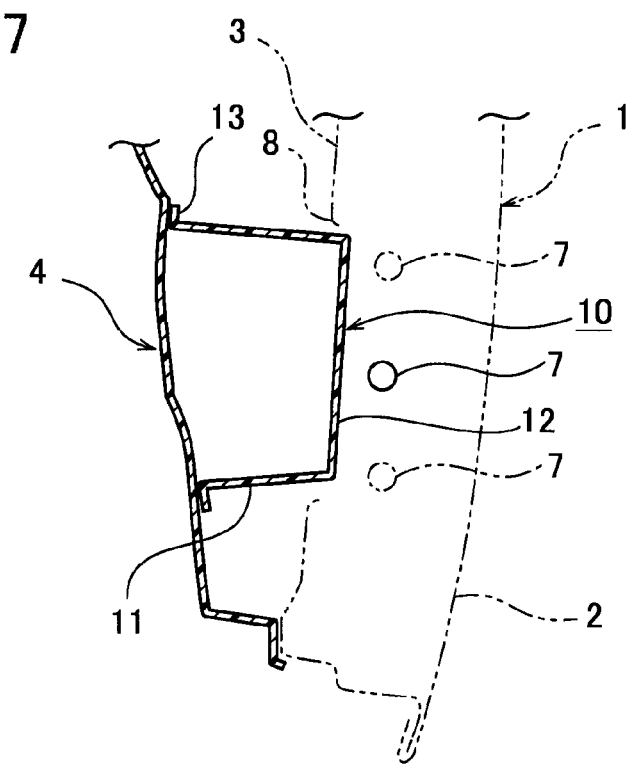
FIG. 7 It is a cross-sectional view showing an example which is similar to the example of FIG. 2 and which differs in an attachment form of a shock-absorbing member.

FIG. 7 shows an example a different form of arrangement of the shock-absorbing member 10.

In this embodiment, in a closed cross section between a door outer panel 2 and a door inner panel 3, an impact beam 7 is provided in a front and back direction of a vehicle, whereby a buffer action at time of a side collision and a door deformation suppression action towards a side of vehicle interior are devised.

The impact beam 7 is provided at almost the same height position as the shock-absorbing member 10, which is fixed on the back face of the door trim 4, i.e., the height position which passes through the inside of a seated occupant's impact area.

An open window portion 8, which the shock-absorbing member 10 faces, is formed in the door inner panel 3, so that the end wall 12 of the direct shock-absorbing member 10 may receive deformation movement of the impact beam 7 towards a side of the vehicle interior.

With the arrangement configuration of this shock-absorbing member 10, since the impact beam 7 is bent and deformed into the vehicle interior side at time of the side collision of a vehicle, the collision energy is absorbed, thereby keeping the amount of displacement towards the vehicle interior side of the side door 1 small.

And the impact beam 7 is brought into contact with the end wall 12 of the shock-absorbing member 10, and the collision energy which has been reduced by the bending deformation of the impact beam 7 is absorbed further by crush and deformation of the shock-absorbing member 10 in an axis direction.

As shown as chain lines in FIG. 7, there are cases where the arrangement height of the impact beam 7 may slightly vary, depending on specification of the vehicle equipped with such an impact beam 7.

Therefore, when the impact beam 7 shifts above or below from the middle position of the shock-absorbing member 10 shown as a solid line in FIG. 7, the impact beam 7 may deviate and is brought in contact with the end wall 12 of the shock-absorbing member 10, so that there may be a possibility that it has an adverse effect not a little on the crush and deformation in the axis direction.

Figure 8:
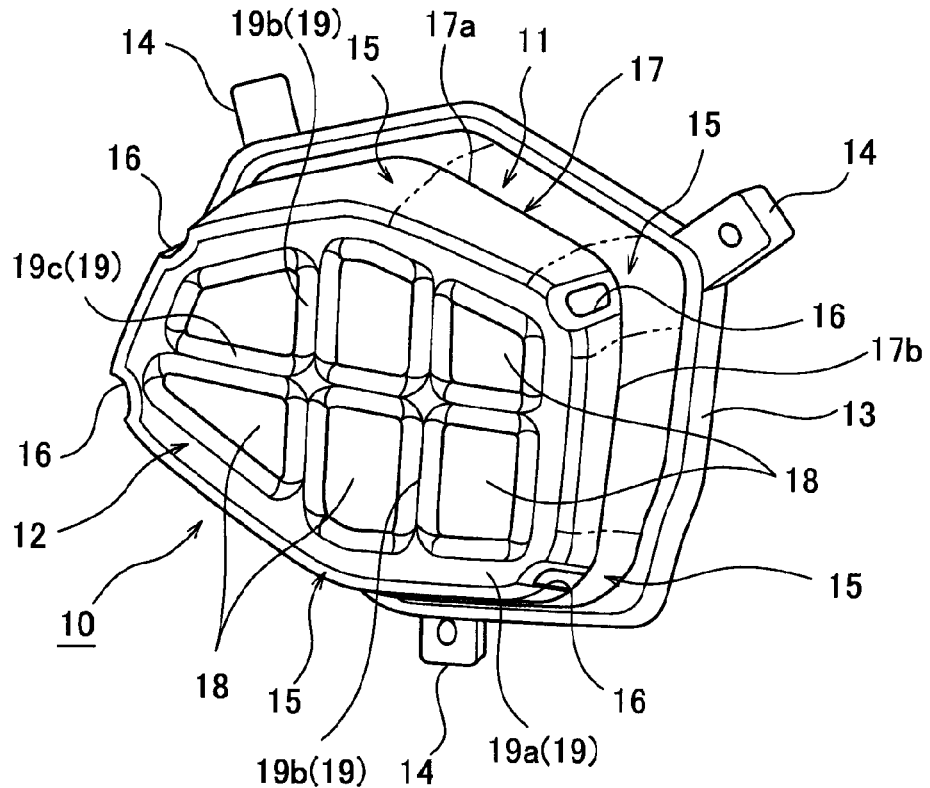
FIG. 8 It is a perspective view of a shock-absorbing member according to a second embodiment.

FIG. 8 shows a preferred shock-absorbing member 10 adopted in a side door 1 of specification in which such an impact beam 7 is used.

In the shock-absorbing member 10 according to this second embodiment, the central portion of the end wall 12 is formed in concavo-convex shape by two or more depressed recess portions 18 and two or more rib portions 19 which divide these depressed recess portions 18.

In the example shown in the figure, the rib portions 19 are formed in a parallel cross like shape made up of an annular portion 19a which is formed along the peripheral edge of the end wall 12, two parallel ribs 19b, which extend in the up-and-down direction, and a rib 19c, which extends in the front and back direction thereof, wherein portions surrounded by them are formed as the depressed recess portions 18.

In the shock-absorbing member 10 according to this second embodiment, since the two or more depressed recess portions 18 and the two or more rib portions 19 of the end wall 12 form the concavo-convex shape, the surface rigidity of the end wall 12 is improved.

As such, as shown as chain lines of FIG. 7, for example, even when the impact beam 7 is shifted above or below from the normal position shown as a solid line, so that the impact beam 7 shifts either above or below the end wall 12, thereby causing deviated contact, a collision load from the impact beam 7 is distributed towards the face of the end wall 12.

Thereby, the collision load is almost uniformly distributed in axis direction with respect to the peripheral wall 11 so that the shock-absorbing member 10 may be crushed and deformed in an axis direction in an orderly manner as mentioned above.

Figure 9:
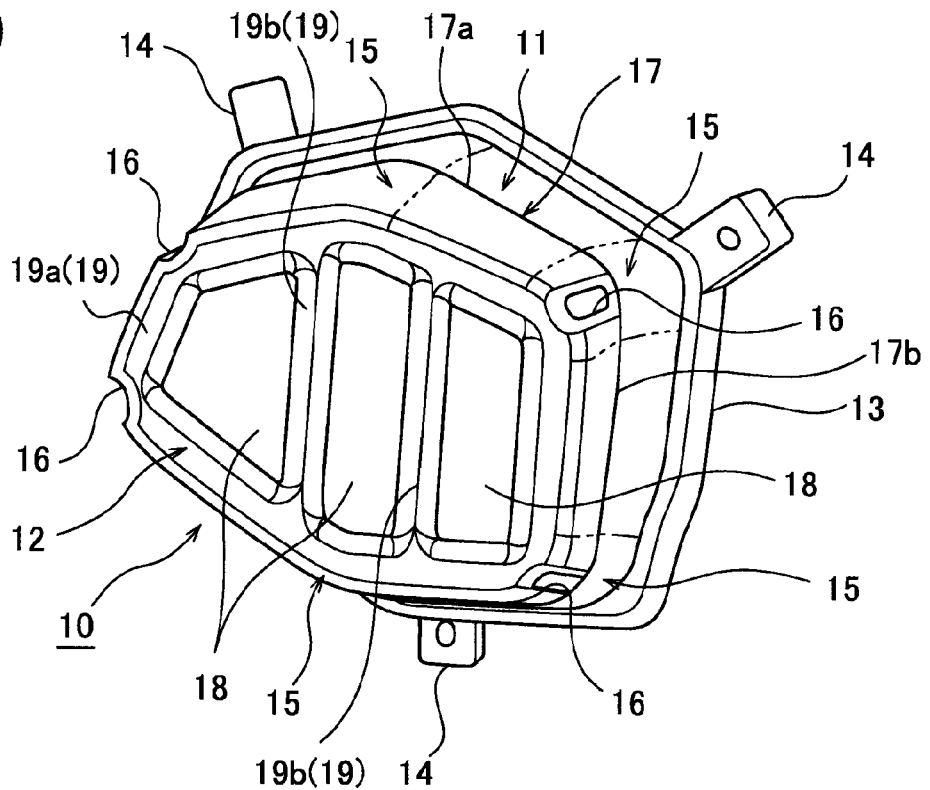
FIG. 9 It shows a perspective view of a shock-absorbing member as a modified example of that shown in the FIG. 8.

Although the rib portion 19 is formed in a parallel cross like shape in the example shown in an FIG. 8, as shown as a modified example in FIG. 9, the horizontal rib 19c may be omitted so that the impact beam 7 may be received by the two vertical ribs 19b which intersect this, and the annular rib 19a of the end wall peripheral edge.

Figure 10:
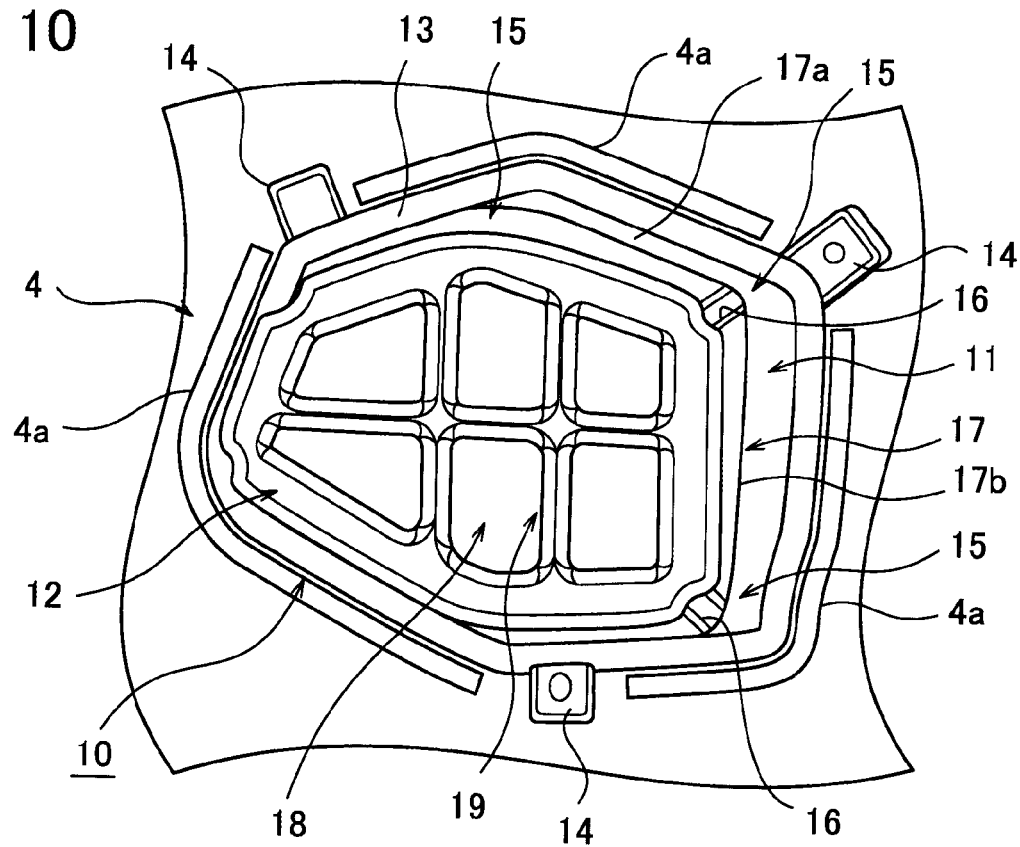

FIG. 10 shows an example in a different arrangement form of the shock-absorbing member 10.

In this embodiment, rib projections 4a, which surround the flange portion 13 of the open part peripheral edge of the shock-absorbing member 10, are integrally molded on a back face of the door trim 4 to which the shock-absorbing member 10 is fixed.

In the arrangement configuration of the shock-absorbing member 10 according to this embodiment, when the shock-absorbing member 10 is crushed and deformed in an axis direction at time of vehicle side collision, deformation in a diameter widening direction of the opening side peripheral edge is suppressed by the rib projections 4a, which are circumscribed to the flange portion 13.

The appropriate crush and deformation of the shock-absorbing member 10 in the axis direction can be maintained thereby, and a much more good collision energy absorption effect can be acquired.

In addition, although an example, in which the shock-absorbing member 10 is provided on the back face of the impact area of the door trim 4 corresponding to the seated occupant's waist, is shown in the above-mentioned embodiment, the shock-absorbing member 10 may be provided on a back face of impact areas corresponding to the seated occupant's waist and a shoulder section in a rear side trim, whereby it is possible to acquire the same effect as the above-mentioned one.

Moreover, although the shape of the shock-absorbing member 10 having a polygonal cylinder, which is a hexagon tube, is illustrated, but it is not limited thereto. As long as the shock-absorbing member has a shape of a polygonal cylinder, which is open on one side and collision energy due to the crush and deformation in an axis direction can be absorbed, any polygonal cylinder or structure may be applicable thereto.

REFERENCE SIGNS LIST

3 Door inner panel (side wall panel of vehicle interior)
4 Door trim (trim material)
4a Rib projection
10 Shock-absorbing member
11 Peripheral wall
12 End wall
13 Flange portion
15 Connecting portion of peripheral wall
16 Slit for compression buckling adjustment
17 Folding line of peripheral wall
18 Depressed recess portion
19 Rib portion

The invention claimed is:

1. An interior side wall structure for a vehicle, comprising:
a synthetic resin shock-absorbing member in a shape of a polygonal cylinder, which is fixed to a back face of a trim material attached in order to cover a side wall panel face on a vehicle interior side, which is open at one side thereof facing trim material, and which has a flange portion projected to outside at a peripheral edge, whereby collision energy is absorbed when the shock-absorbing member is crushed and deformed in response to a collision load at time of a vehicle side collision,
wherein a connecting portion between adjacent side walls in a peripheral wall of the shock-absorbing member is formed in an arc shape, and a slit for compression buckling adjustment, which has a necessary length, is formed at an approximately top part of the arc shape in an input direction of a collision load in a range between a corner part where the peripheral wall and an end wall of the shock-absorbing member are adjoined to each other, and the flange portion.

2. The interior side wall structure for a vehicle according to claim 1, wherein a cut-out corner portion of the slit for compression buckling adjustment is formed in an arc shape.

3. The interior side wall structure for a vehicle according to claim 1, wherein the shock-absorbing member has a folding line, which annularly extends on the peripheral wall, and a folding line is formed in either an up-and-down direction or a front-and-back direction, and is made up of an outer folding line, which projects toward an outer side in a radial direction and an inward folding line, which projects towards an inner side in the radial direction.

4. The interior side wall structure for a vehicle according to claim 1, wherein a central portion of the end wall of the shock-absorbing member is formed in concavo-convex shape by two or more depressed recess portions and two or more rib portions which divide these depressed recess portions.

5. The interior side wall structure for a vehicle according to claim 1, wherein a door trim includes a rib projection which surrounds the flange portion of the shock-absorbing member.

\* \* \* \* \*